Jan. 1, 1952

H. J. RATHBUN 2,581,292

CONTROL SYSTEM FOR INDUCTION MOTORS
AND BRAKING GENERATOR COMBINATION

Filed Aug. 25, 1950

Harold J. Rathbun Inventor

By John H. Leonard &
Harold J. Rathbun,
his Attorneys

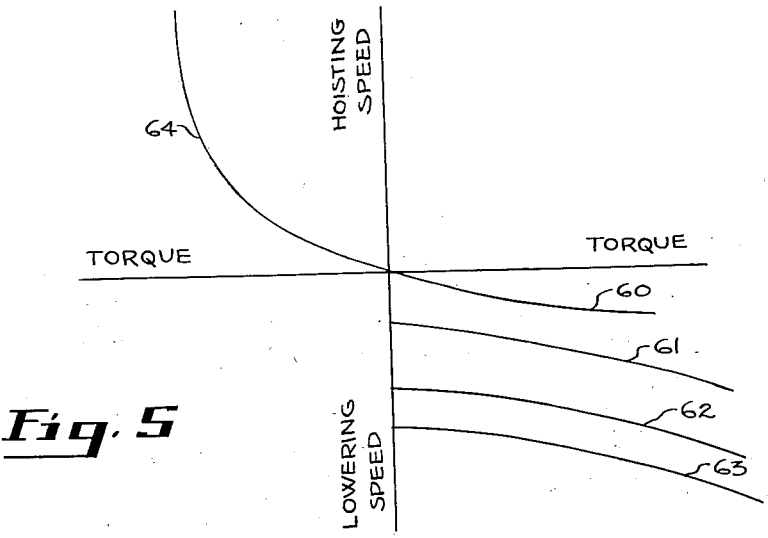
Fig. 5
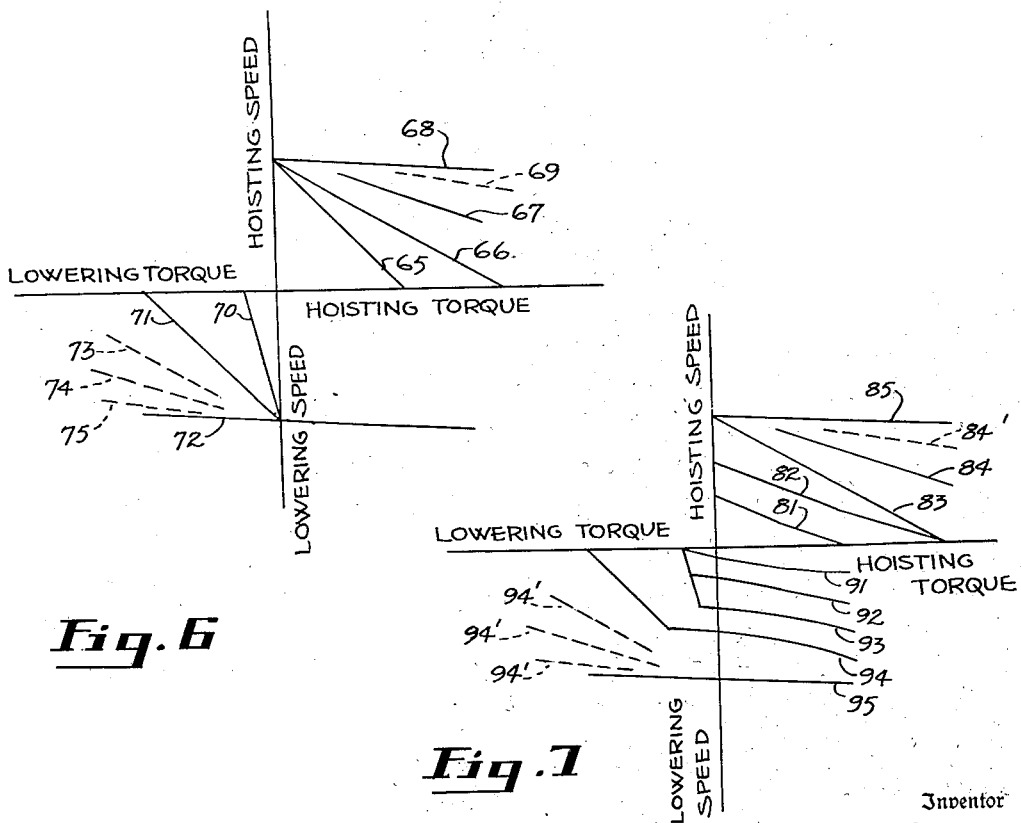
Fig. 6
Fig. 7

Patented Jan. 1, 1952

2,581,292

UNITED STATES PATENT OFFICE 2,581,292

CONTROL SYSTEM FOR INDUCTION MOTORS AND BRAKING GENERATOR COMBINATION

Harold J. Rathbun, Cleveland, Ohio, assignor to The Electric Controller & Manufacturing Company, Cleveland, Ohio, a corporation of Ohio Application August 25, 1950, Serial No. 181,365

10 Claims. (Cl. 318—203)

This invention relates to systems of control for motor drives in which a polyphase wound rotor induction motor coupled to an artificial load is utilized for apparatus in which the actual load at times overhauls and drives the motor and its artificial load and in which the overhauling load must be retarded to limit its speed. The invention is particularly applicable to hoist applications and is hereinafter described as applied to that use.

Braking generators have been used as artificial loads for polyphase wound rotor induction motors driving the hoist motion of cranes to give undersynchronous speed control during hoisting as well as during both power and overhauling lowering. When used for braking purposes, generators of the eddy current type, commonly referred to as "eddy current brakes," possess some advantages, such as simplicity and cost, over D.-C. excited squirrel cage machines and D.-C. shunt, series, or compound generators having external load circuits.

Until recently, eddy current brakes were of limited advantage in hoist applications because of the pronounced decrease in torque with speed after reaching a predetermined maximum torque, as evidenced by their so-called drooping speed-torque characteristics. Recent improvements in the design of eddy current generators or brakes have eliminated the need of auxiliary equipment for preventing the torque of the eddy current brake from decreasing at high speeds. Accordingly, the substitution of the improved eddy current brakes for the earlier eddy current brakes, generators, and other equivalent artificial loading means for polyphase wound rotor motors in hoist equipment has resulted in obvious advantages of simplicity and economy. Even so, the improved eddy current brakes leave something to be desired in hoist applications.

For example, when excited at constant voltage, the torque output of these improved brakes reaches a predetermined maximum value at relatively low speed and, while not decreasing, nevertheless, as the speed increases, either does not continuously increase or increases less rapidly than is desirable for most efficient braking in hoist applications. Consequently, since the lowering torque of an overload on a hoist may exceed the full load torque of the motor, safety requires that the eddy current brake, when excited at a predetermined constant voltage, have a maximum torque output considerably in excess of the full load torque of the motor. This is particularly important if the motor is to be deenergized and the brake alone used for lowering in any speed point or if the motor is to operate under balanced voltage conditions with a relatively large secondary resistance in any lowering speed point. In addition to the obvious disadvantages of cost and space requirements of the larger brake, the larger brake when excited with a constant voltage sufficient to cause adequate torque to be produced in the higher speed range of some lowering speed points causes too much torque for most efficient operation in the lower speed range of those speed points.

The improved eddy current brake exciting circuit of this invention may be arranged in a hoist control system to excite the eddy current brake at a predetermined base value at standstill for one of several lowering speed points, the exciting circuit automatically increasing the excitation with speed at such a rate that the torque output of the brake is correlated with the torque output of the motor for said speed point to provide a substantially constant slow lowering speed. Increased lowering speeds may be obtained by maintaining the secondary resistance of the motor constant and adjusting the exciting circuit so that the eddy current brake excitation is zero at speeds below predetermined selected speeds, the exciting circuit automatically increasing the excitation rapidly with speed when the predetermined speeds are reached. A still faster lowering speed may be obtained by decreasing the secondary resistance of the motor and concurrently adjusting the exciting circuit so that the eddy current brake is unexcited until a predetermined relatively high speed is reached. Improved lowering characteristics result from the lack of excitation of the brake when the motor is operating in the lower speed ranges of the several speed points and from the rapid increase in excitation of the brake in the higher speed ranges of each speed point. The speed at which excitation of the brake is initiated and the rate of increase in excitation with speed may be so correlated with the selected value of secondary resistance that the lowering speed is substantially constant throughout the entire normal and abnormal loading range of the hoist.

The improved eddy current brake exciting circuit in accordance with this invention comprises means for selectively opposing variable unidirectional voltages derived from the secondary circuit of the hoist motor with respective constant unidirectional reference voltages adjustable to be either larger or smaller than the corresponding variable voltages at standstill. The variable resultant voltages in each instance are impressed through a blocking rectifier, or other asymmetrical impedance device, on the energizing winding of the brake. Means are provided for adjusting the voltages selectively so that the voltage across the brake winding may have either a material value at standstill which increases with the speed of the hoist motor up to synchronous speed or may have zero value until predetermined different speeds are reached after which it increases rapidly with speed. Since the voltage derived from the secondary circuit of the motor varies with speed as well as with the amount of resistance effective in the secondary circuit, the constant voltages are accordingly selected in co-ordinated relation with the changes in the secondary resistance so that the resultant voltages have a range of variation for the respective lowering speed points to give the desired improved performance.

It is an object of this invention to provide an improved alternating hoist control system having the foregoing operating advantages.

Another object is to provide an improved circuit for exciting the field winding of a braking generator mechanically coupled to a polyphase wound rotor induction motor.

A further object is to provide an improved hoist control system for a polyphase wound rotor induction motor coupled to a braking generator constituting an artificial load for the motor which controls the excitation of the generator in relation to the electrical condition of the secondary circuit of the motor.

A further object is to provide an improved alternating current hoist control system which correlates the characteristics of a polyphase wound rotor induction motor and an eddy current brake excited in relation to the secondary voltage of the motor.

A more specific object is to provide an alternating current hoist control system which correlates the characteristics of a polyphase wound rotor induction motor and an eddy current brake excited by a voltage which is the differential of a voltage derived from the secondary of the motor and a constant reference voltage which is smaller than the derived voltage at standstill and larger than the derived voltage at speeds under synchronism.

An additional object is to provide an exciting circuit for a braking generator mechanically coupled to a polyphase wound rotor induction motor which applies to the generator, through a circuit including a blocking rectifier, a differential voltage obtained by opposing a constant voltage and a variable unidirectional voltage derived from the secondary circuit of the motor.

Other objects and advantages will become apparent from the following description wherein reference is made to the drawings, in which:

Fig. 5 is a graph showing operating characteristics of the braking machine when excited by the resultant voltages, selectively;

Fig. 6 is a graph showing operating characteristics of the motor; and

Fig. 7 is a graph showing combined operating characteristics of the motor and braking machine.

Figure 1:
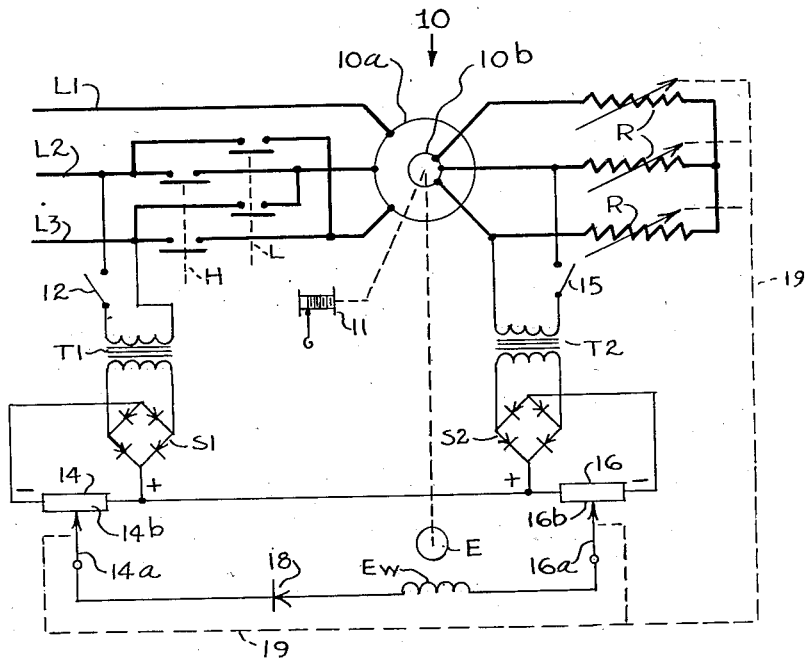
Fig. 1 is a wiring diagram illustrating one form of the improved exciting circuit.

Referring to Fig. 1, a polyphase wound-rotor induction motor 10 driving a hoist drum 11 is arranged to have its primary winding 10a connected to power supply conductors L1, L2, and L3, selectively, for hoisting and lowering by means of a hoisting switch H and a lowering switch L. A plurality of adjustable resistors R are connected in a Y network across terminals of a secondary winding 10b of the motor 10. A transformer T1 has its primary winding arranged to be connected across the supply conductors L2 and L3 by means of a switch 12 and has its secondary winding connected to a full wave rectifier S1, the direct current output of which is applied across a potentiometer resistor 14. A transformer T2 has its primary winding arranged to be connected across two of the secondary terminals of the motor 10 by means of a switch 15 and has its secondary winding connected to a full wave rectifier S2, the direct current output of which is applied across a potentiometer resistor 16. The positive terminals of the resistors 14 and 16 are connected directly to each other whereas intermediate points along the resistors 14 and 16, selected by potentiometer sliders 14a and 16a, respectively, are connected to respective opposite terminals of an exciting winding Ew of an eddy current brake E or other suitable braking machine driven by the motor 10 either directly as shown or by means of a suitable gear train. A portion 14b of the resistor 14 between the positive terminal thereof and the slider 14a and a portion 16b of the resistor 16 between the positive terminal thereof and the slider 16a are thus connected in a closed loop circuit with the winding Ew. The voltage across the resistor portion 14b is opposed to the voltage across the resistor portion 16b so that the voltage impressed on the winding Ew is a differential voltage which varies inversely with respect to the voltage across the resistor 16. Since the voltage across the resistor 16 depends upon the speed of the motor 10 and varies substantially inversely with respect thereto, the voltage impressed on the winding Ew varies substantially directly with the speed of the motor 10.

In accordance with this invention, a blocking rectifier 18 or other suitable asymmetrical impedance device is interposed in the loop circuit and is so poled that current can flow therethrough to the winding Ew only when the voltage across the resistor portion 14b is in excess of the voltage across the resistor portion 16b. Since the voltage across the resistor portion 16b decreases during acceleration of the motor, it eventually becomes less than the voltage across the resistor portion 14b and the winding Ew thereupon becomes excited. Broken lines 19 indicate that the resistors R, 14, and 16 are adjustable in a predetermined correlated relationship, as will be explained in detail hereinafter.

Figure 2:
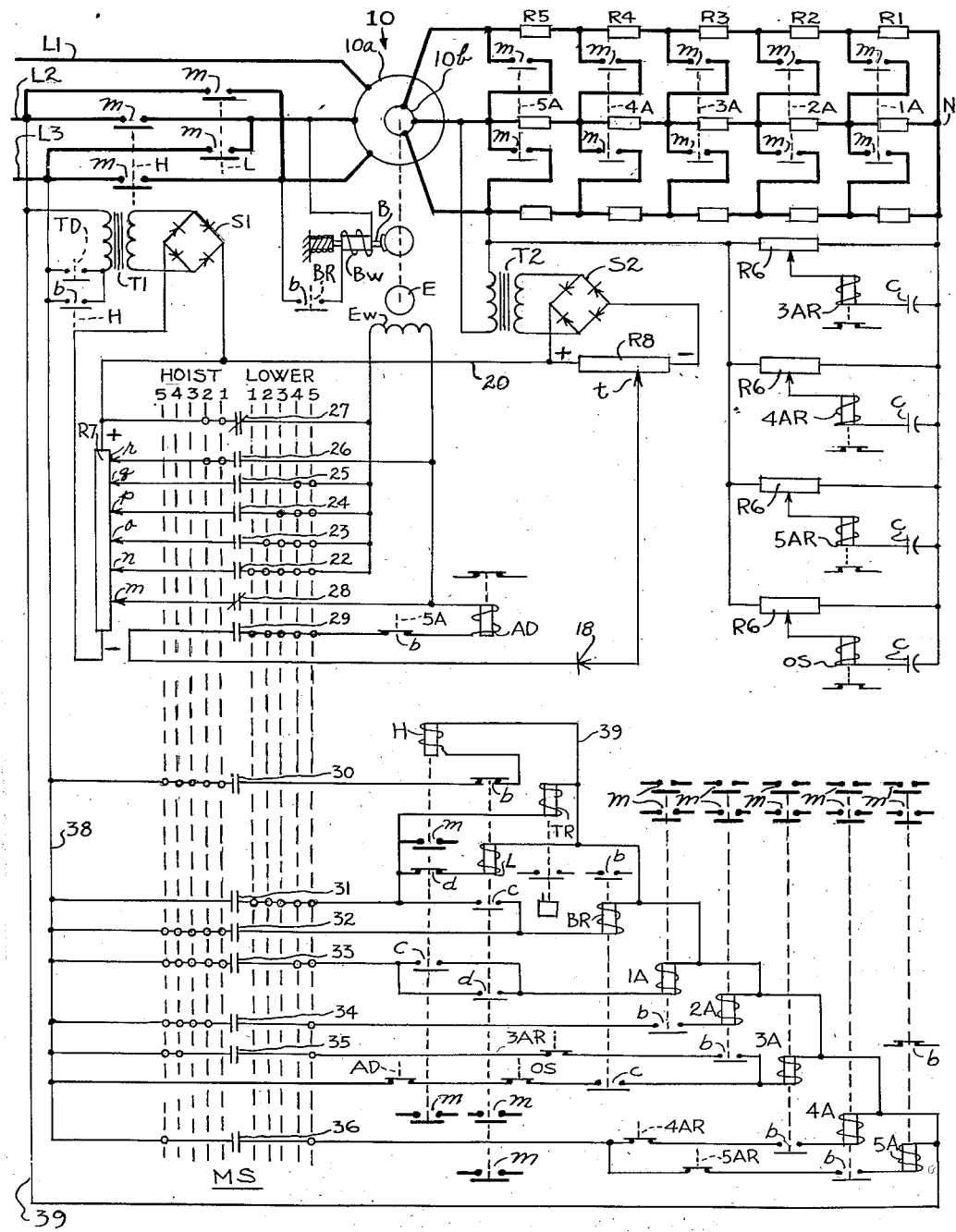
Fig. 2 is a wiring diagram showing the exciting circuit of Fig. 1 in a hoist control system for a motor coupled to a braking machine such as an eddy current brake.

The brake exciting circuit of Fig. 1 may be incorporated into a complete hoist controller as illustrated in Fig. 2. Referring to Fig. 2, the secondary winding 10b of the hoist motor 10 is connected to a balanced Y connected resistance bank corresponding to the bank R of Fig. 1 and shown as having sections R1, R2, R3, R4, and R5 and a neutral point N. The motor 10 is shown as provided with a suitable, spring-applied, electromagnetically-released friction brake B having an operating winding Bw. Although in the preferred embodiment of the invention the braking machine is shown as the eddy current brake E having the exciting winding Ew, it will be understood that other types of generators and electric power consuming devices having suitable speed-torque characteristics, such, for example, the newer magnetic brakes using powdered iron, may be used if desired to obtain many of the advantages of this invention.

The control system of Fig. 2 comprises a plurality of electromagnetic contactors and relays each of which is diagrammatically shown on the drawing. To simplify the drawing, many of the contactor and relay contacts are shown in convenient physical locations in the wiring diagram as well as in conjunction with their respective operating windings.

Power connections for causing the motor 10 to operate in the hoisting direction are completed upon closure of main contacts m of the electromagnetic contactor H, and power connections for causing the motor 10 to operate in the lowering direction are completed upon closure of main contacts m of the electromagnetic contactor L.

Control of the amount of resistance effectively inserted in the secondary circuit of the motor 10 may be provided by a plurality of electromagnetic contactors 1A, 2A, 3A, 4A, and 5A, each having a pair of main contacts indicated at m for selectively short circuiting the resistance sections R1, R2, R3, R4, and R5. The secondary circuit may also include a plurality of electromagnetic, speed responsive, acceleration relays 3AR, 4AR, and 5AR, and an overspeed relay OS. The relays 3AR, 4AR, and 5AR are connected in resonant operating circuits of the type described and claimed in Leitch Patent No. 2,165,491, and a complete description of their operation in a hoist controller may be had from McArthur et al. Patent No. 2,325,413. Hence, only a brief description of these relay circuits is included herein. The overspeed relay OS may be of any suitable type and for simplicity is shown as an electromagnetic relay connected in a similar resonant operating circuit.

Each of the resonant relay operating circuits comprises a suitable capacitor C and a potentiometer resistor R6, the resistors R6 being connected in parallel with each other between one of the secondary motor terminals and the neutral point N. The operating windings of the relays 3AR, 4AR, 5AR, and OS are connected in series with their respective capacitors C between an adjustable tap on their respective resistors R6 and the neutral point N. As explained in the aforementioned Leitch patent, the relays 3AR, 4AR, 5AR, and OS have respective sets of normally-closed contacts which open concurrently upon application of power to the primary winding 10a of the motor 10 and which close in sequence at predetermined speeds as the motor accelerates depending upon the capacity of the respective capacitors C, closure of the relay contacts being caused by impairment of resonance of the respective relay circuits as the frequency of the secondary voltage decreases during acceleration of the motor.

The brake winding Bw is connected across two of the primary terminals of the motor 10 when contacts b of a suitable brake relay BR are closed.

The winding Ew of the eddy current brake E is energized at certain times during lowering operations of the motor 10 by the resultant of two unidirectional voltages appearing across portions of respective potentiometer resistors R7 and R8 and for a time interval after deenergization of the motor 10 subsequent to a lowering operation and at certain times during hoisting operations by the unidirectional voltage across portions of the resistor R7 alone. The resistor R7 is connected across the output terminals of the rectifier S1 and the resistor R8 is connected across the output terminals of the rectifier S2, the positive terminals of the resistors R7 and R8 being connected to each other by a conductor 20. The resistors R7 and R8 thus correspond to the resistors 14 and 16, respectively, of Fig. 1. The transformer T1 which has its primary winding arranged to be connected across the supply lines L2 and L3 by slow-to-open normally open contacts of a time delay relay TD or by normally open auxiliary contacts b of the hoisting contactor H supplies a substantially constant alternating voltage to the rectifier S1, and a transformer T2 having its primary winding connected across two of the secondary motor terminals supplies an alternating voltage to the rectifier S2 which varies substantially inversely with the speed of the motor 10 at speeds below synchronism. The resistor R8 has an adjustable tap t, and the resistor R7 has a plurality of intermediate taps m through r, the taps n through q being connectable to a terminal of the winding Ew by means of contacts 22 through 25, respectively, of a multi-position master switch MS also having contacts 26 through 36.

In the off position of the master switch MS, the contacts 27 and 28 are closed and all of the other master switch contacts are open. When the master switch MS is operated in either the hoisting or lowering direction, its contacts are open except as closure thereof is indicated by the circles in horizontal alignment with the contacts, each circle indicating that its horizontally aligned contacts are closed for the respective position of the master switch. Thus for example, the contacts 35 are closed in the last two hoisting positions and in the last lowering position, and are open in all other positions. The contacts 30 through 36 are interposed in respective energizing circuits for the operating windings of all of the contactors and the relays BR and TR extending between conductors 38 and 39 which are connected to the supply lines L3 and L2, respectively.

An electromagnetic relay AD having its operating winding connected in series with the winding Ew is provided to protect against excessive lowering speeds in a manner to be described should the winding Ew inadvertently become deenergized during lowering. Before considering the operation of the control system of Fig. 2 in detail, its general functions will be explained with reference to Figs. 3 through 7.

Figure 3:
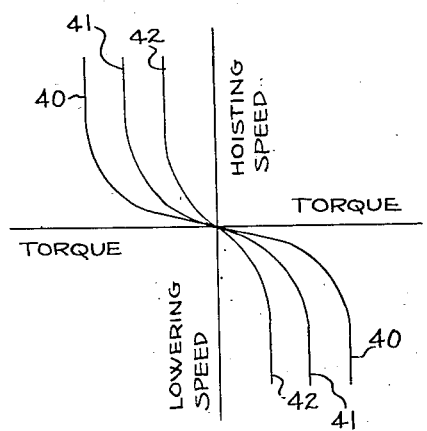
Fig. 3 is a graph showing operating characteristics of the braking machine.

Curves 40, 41, and 42 in Fig. 3 are typical speed-torque curves of a preferred form of eddy current brake E, and are illustrative of speed-torque curves of other types of braking machines that might be used in accordance with this invention. The curve 40 indicates the operation of the brake E when the winding Ew is excited at its rated voltage, and the curves 41 and 42 indicate operation of the brake E when the winding Ew is excited by reduced constant voltages equal to sixty and twenty percent, respectively, of the rated voltage. The curves 40, 41, and 42 show that the torque of the eddy current brake E is zero at standstill and increases with speed in opposition to the driving torque as the brake is driven in the hoisting and lowering directions. With constant voltages applied to the winding Ew, a definite maximum torque is produced by the brake E at a predetermined speed, the magnitude of the maximum torque and to a lesser degree the exact speed at which it is reached depending upon the value of the constant voltage impressed on the winding Ew.

Figure 4:
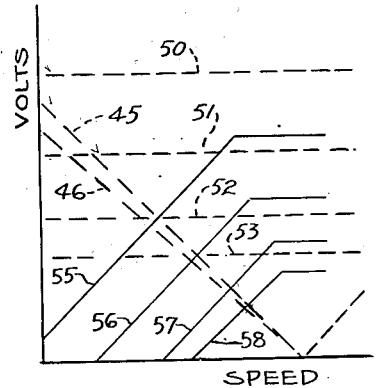
Fig. 4 is a graph showing how various resultant exciting voltages for the braking machine are obtained and how they vary with speed.

The curves of Fig. 4, wherein volts are plotted against speed of the motor 10, show how the resultant voltages impressed on the winding Ew are caused to increase with speed in accordance with this invention. Curves 45 and 46 show the variation, as the motor speed changes, of the voltage between the positive terminal of the resistor R8 and the tap t thereof for two different values of external secondary circuit resistance. The curve 45 is for operation when none of the resistor sections R1, R2, R3, R4, R5 is short circuited, the curve 46 is for operation when the resistor section R1 is short circuited. Curves 50, 51, 52, and 53 show how the value of the substantially constant voltage between the positive terminal of the resistor R7 and the left-hand terminal of the winding Ew (Fig. 2) is adjusted as the contacts 22, 23, 24, and 25 are operated during lowering. The various adjusted values of this voltage may decrease slightly with increase in the excitation of the brake E, but for purposes of explanation, and in operative effect, may be considered to be constant. Curves 55, 56, and 57 show the variation of the resultant voltages at the terminals of the winding Ew when the variable voltages indicated by the curve 45 are opposed by the voltages indicated by the curves 50, 51 and 52, respectively. A curve 58 shows the voltage at the terminals of the winding Ew when the variable voltage indicated by the curve 46 is opposed by the voltage indicated by the curve 53. It should be noted that only the voltage 58 is in excess of the variable voltages at standstill and that the voltages 51, 52, and 53 become greater than the variable voltages at predetermined different speeds, the rectifier 18 maintaining the voltages 56, 57, and 58 zero until the respective predetermined speeds are reached.

Curves 60, 61, 62, and 63 in Fig. 5 are speed-torque curves for the eddy current brake E when the winding Ew is excited by the voltages indicated by the curves 55, 56, 57, and 58, respectively. By comparing Fig. 5 with Fig. 3 it is to be noted that the variable excitation of the brake E causes the torque of the brake to increase continuously with speed throughout the operating range instead of merely increasing until a substantially fixed maximum value is reached. The curves 61, 62, and 63 show that the blocking rectifier 18 prevents the brake E from becoming excited until selected speeds are reached. The relative magnitude of the opposed constant and variable voltages then cause a rapid increase in excitation with speed. A curve 64 of Fig. 5 shows the speed-torque characteristic of the brake Ew when excited at a constant voltage during hoisting operations.

The speed torque curves of Fig. 6 show the several operating characteristics of the motor 10 that may be provided upon manipulation of the master switch MS. The motor 10 may operate as indicated by curves 65, 66, 67, and 68 during hoisting, a curve 69 indicating an intermediate hoisting acceleration point. The motor 10 may operate as indicated by the curves 70, 71, and 72 during lowering, the curves 73, 74, and 75 indicating intermediate lowering acceleration points.

Fig. 7 shows resultant speed-torque characteristics that are obtained by combining in a properly correlated manner the speed-torque characteristics of Fig. 5 and Fig. 6 in the manner herein disclosed. The curves of Fig. 7 thus show the operating characteristics of the hoist or the speed-torque relations at the common motor and brake shafts whereas the curves of Fig. 5 show the speed-torque relations of the eddy current brake E alone and the curves of Fig. 6 show the speed-torque relations of the motor 10 alone. In Fig. 7, curves 81 through 85 indicate the operation of the hoist during hoisting operations and likewise the curves 91 through 95 indicate the operation of the hoist during lowering operations. A curve 84' and curves 94' indicate operation during acceleration between curves 84 and 85 and between 94 and 95, respectively.

In the first hoisting speed point, the motor 10 is connected so as to operate as indicated by the curve 65, the brake E is connected so as to operate as indicated by the curve 64, and the hoist consequently operates as indicated by the curve 81. In the second hoisting position the brake excitation remains unchanged and the motor 10 operates as indicated by the curve 66, the curve 82 being the resultant curve for the hoist. In the last three hoisting positions the brake E is deenergized and the motor 10 is used alone to hoist the load. Thus the curves 83, 84, 84', and 85 are the same as the curves 66, 67, 69, and 68, respectively.

In the first lowering position the motor operates as indicated by the curve 70 and drives the brake E which exerts retarding torque as indicated by the curve 60, the curve 91 indicating the resultant torque. In the second and third lowering positions of the master switch MS, the motor 10 continues to operate along the curve 70 and is opposed by the brake E operating along the curves 61 and 62, respectively, and the resultant torque varies as indicated by the curves 92 and 93, respectively. In the fourth lowering position, the motor 10 operates along the curve 71 and the brake E along the curve 63, and the resultant torque is as shown by the curve 94. The brake E remains energized during acceleration of the motor between the curves 71 and 72 so that the curves 94' becomes the resultant accelerating curves in lowering. In the fifth lowering position, the brake E is deenergized, and the motor 10 operates in accordance with the curve 95 which is the same as the curve 72. It should be noted that the resultant torque in all lowering positions increases continuously with speed so that overloads cannot cause excessive speeds to be reached regardless of the speed point selected.

Since the brake torque is relatively low in the lower speed range of the first lowering speed point and is zero in the lower speed ranges of each of the second, third, and fourth speed points, and increases rapidly to high values in the high speed ranges for each of these speed points, the speed regulation of the hoist is improved.

In prior eddy current braking hoist controllers using constant voltages for exciting the eddy current brake and in which the brake has been driven by the motor operating with balanced polyphase voltages, relatively large increases in speed are obtained when the overhauling torque exceeds a value in the neighborhood of rated load. In the slower speed points of such controllers, the resultant torque fails to increase rapidly enough with speed to prevent run-away conditions to be approached unless a relatively large brake is used. The constant excitation of the large brake causes the brake torque to be larger than necessary at slow speeds in all speed points thus resulting in speeds which are too slow and in undue brake and motor heating. By varying the brake excitation with speed in the manner herein disclosed, the lowering speed increases very little with load in all speed points. Improved correlation between brake and motor torque is thereby obtained. The retarding torque in all lowering speed points increases continuously and rapidly with speed even beyond the usual overload range. The overall heating of the brake is reduced because its torque output is controlled in accordance with the need for the torque and is consequently greatly reduced or made zero when possible.

Prior eddy current braking hoist controllers in which pilot generators have been used as the source of excitation of the brake have not provided the desired correlation herein described and further the use of an extra rotating machine renders them too costly and complicated for many installations. By utilizing the variation in secondary voltage of the motor to alter the torque output of the brake in the manner herein described, the applicant has succeeded in providing a coordinated controller of extreme simplicity providing advantages not heretofore obtainable.

Considering now the detailed operation of the control system, in the first hoisting position of the master switch MS, the contacts 30 and 32 close to complete energizing circuits for the contactor H and the relay BR, respectively, the circuit for the contactor H including normally closed contacts b of the contactor L. The contactor H thereupon responds to close its contacts m to connect the motor 10 for hoisting operations and the relay BR responds to close its contacts b to complete an energizing circuit for the winding Bw of the brake B which thereupon releases. The contacts 33 also close in the first hoisting position, and, after closure of normally open auxiliary contacts c of the contactor H, complete an energizing circuit for the contactor 1A which thereupon closes its contacts m to short-circuit the resistor section R1. The motor 10 is now connected for operation in accordance with the curve 65 of Fig. 6.

As soon as the contacts m of the contactor H close, the relays 3AR, 4AR, 5AR, and OS pick up to open their respective normally-closed contacts. The opening of these contacts has no effect at this time.

Closure of the contacts b of the contactor H connects the transformer T1 to the supply lines L2 and L3 whereby a unidirectional voltage appears across the resistor R7 with the polarity indicated.

In the first hoisting position of the master switch MS, the contacts 28 are open and the contacts 26 and 27 are closed. This connects the winding Ew between the positive terminal of the resistor R7 and the tap r thereof. The tap r on the resistor R7 is so selected that the eddy current brake operates as indicated by the curve 64 of Fig. 5. As mentioned above, the motor is now operating as indicated by the curve 65 of Fig. 6, and the resultant torque available to retard a load varies as indicated by the curve 81 of Fig. 7.

In the second hoisting position of the master switch MS, the contacts 34 close to complete the energizing circuit for the contactor 2A through the now closed normally open auxiliary contacts b of the contactor 1A. The contactor 2A thereupon closes its contacts m to short circuit the additional resistor section R2 and the motor is now connected for operation as indicated by the curve 66 of Fig. 6. Also in the second hoisting position, the contacts 26 and 27 of the master switch MS remain closed causing the brake E to continue to operate as indicated by the curve 64. Since the motor is now connected for operation as indicated by the curve 66 of Fig. 6, the resultant torque available to hoist a load varies as indicated by the curve 82 of Fig. 7.

In the third hoisting position, the contacts 26 and 27 of the master switch MS open to disconnect the winding Ew from its source of energization. Since the eddy current brake E is now deenergized and the motor circuit has not been changed, the torque available at the motor shaft is as indicated by the curve 83 of Fig. 7 which is the same as the curve 66 of Fig. 6.

In the fourth hoisting position of the master switch MS, the contacts 35 in the energizing circuit for the contactor 3A close. When the speed of the motor 10 reaches a predetermined value, or if it is already at that value, the relay 3AR closes its contacts. The energizing circuit for the contactor 3A is then completed through now closed normally open auxiliary contacts b of the contactor 2A. The resultant closure of the contactor 3A short circuits the additional resistor section R3 and the motor now operates as indicated by the curve 67 of Fig. 6 which is the same as the curve 84 of Fig. 7.

Movement of the master switch MS to the last hoisting position closes the contacts 36 in the energizing circuits for the contactors 4A and 5A. When the motor speed reaches a predetermined value, the relay 4AR closes its contacts to complete the energizing circuit for the contactor 4A through now closed normally open auxiliary contacts b of the contactor 3A. The resultant closure of the contacts m of the contactor 4A short circuits the additional resistor section R4 and causes the motor to accelerate as indicated by the curve 69 of Fig. 6 until a speed is reached at which the relay 5AR closes its contacts to complete the energizing circuit for the contactor 5A through now closed normally open auxiliary contacts b of the contactor 4A. The contactor 5A thereupon responds to short circuit all of the secondary resistor sections R1 through R5. The motor now operates as indicated by the curve 68 of Fig. 6 and the hoist operates as indicated by the curve 85 of Fig. 7.

Return of the master switch MS from the last hoisting position to the off position results in a switching sequence opposite to that just described. When the off point is reached, the motor 10, the brake B, and the eddy current brake E are all deenergized and the load is held in the elevated position by the brake B.

In the first lowering position of the master switch MS, the contacts 31 close to complete an energizing circuit for the contactor L through normally-closed auxiliary contacts d of the contactor H. The contactor L thereupon responds to close its contacts m to connect the motor 10 for lowering operations and closes its normally open auxiliary contacts c to complete an energizing circuit through the contacts 31 for the relay BR which responds to close its contacts b causing the brake B to release. The motor is now connected for operation as indicated by the curve 70 of Fig. 6, all of the resistor sections R1 through R5 being effective in the secondary circuit.

As soon as the contacts m of the contactor L close, the relays 3AR, 4AR, 5AR, and OS pick up to open their respective normally closed contacts.

Closure of the contacts 31 also completes an energizing circuit for the time delay relay TD which thereupon closes its contacts immediately to connect the primary winding of the transformer T1 across the supply leads L2 and L3.

Also, in the first lowering position, the contacts 27 and 28 are open and the contacts 22 and 29 are closed, and consequently the winding Ew is connected between the tap t on the resistor R8 and the tap n on the resistor R7. With the resistor sections R1 through R5 effective in the secondary circuit, the voltage between the positive terminal of the resistor R8 and the tap t varies as indicated by the curve 45 of Fig. 4. The tape n on the resistor R7 is so selected that the voltage between the positive terminal of the resistor R7 and the tap n is as indicated by the curve 50 of Fig. 4. The voltages 45 and 50 are opposed to each other and the voltage across the winding Ew is the resultant thereof and varies as indicated by the curve 55. With the voltage 55 impressed on its winding Ew the eddy current brake E operates as indicated by the curve 60 of Fig. 5. As mentioned above, the motor is now operating as indicated by the curve 70 of Fig. 6 and the resultant torque available to retard a load varies as indicated by the curve 91 of Fig. 7.

As soon as a low value of excitation current flows through the winding Ew, the relay AD operates to open its normally-closed contacts which are connected in series with normally-open contacts c of the relay BR and the normally closed contacts of the relay OS in an emergency energizing circuit for the contactor 3A between the conductors 38 and 39. this circuit is interrupted by opening of the contacts of the relay OS as soon as power is applied to the primary of the motor and prior to closure of the contacts c of the relay BR. Should the motor 10 accelerate to a speed higher than the speed setting of the relay OS before the contactor 3A closes, the relay OS drops out and closes its contacts. This high speed can be obtained only if the excitation of the eddy current brake E has failed which would cause closure of the relay AD. The emergency excitation of the contactor 3A removes sufficient resistance from the secondary circuit to limit the speed of the motor 10 to a safe value by regenerative braking.

In the second lowering position of the master switch MS, the contacts 23 of the master switch MS are closed and connect the winding Ew between the taps n and o on the resistor R7 and the tap t on the resistor R8. The voltage impressed on the winding Ew now varies in accordance with the curve 56 of Fig. 4 and the brake operates as indicated by the curve 61 of Fig. 5. The amount of secondary resistance in the secondary circuit is unaltered so that the motor continues to operate as indicated by the curve 70 of Fig. 6, and the hoist operates as indicated by the curve 92 of Fig. 7.

In the third lowering position of the master switch MS, the contacts 24 close to connect the eddy current brake winding Ew between the taps n, o, and p and the tap t so that the voltage across the winding Ew is as indicated by the curve 57 of Fig. 4 and the torque output of the brake E is as indicated by the curve 62 of Fig. 5. The resultant speed-torque characteristic of the hoist is the curve 93.

In the fourth lowering position of the master switch MS, the contacts 33 close to complete the energizing circuit for the contactor 1A through now closed normally open auxiliary contacts d of the contactor L. Response of the contactor 1A causes the resistor section R1 to be short circuited and the motor operates as indicated by the curve 71. Also, in the fourth lowering position, the contacts 25 close to connect the winding Ew between the taps n, o, p, and q and the tap t so that the voltage across the winding Ew varies as indicated by the curve 58 of Fig. 4. The torque output of the brake E is now as indicated by the curve 63 of Fig. 5 and the hoist operates as indicated by the curve 94.

Movement of the master switch MS to the fifth lowering position closes the contacts 34, 35, and 36. Closure of the contacts 34 completes the energizing circuit for the contactor 2A through the now closed contacts b of the contactor 1A. The motor now operates as indicated by the curve 73 of Fig. 6. The energizing circuit for the contactor 3A is completed through the contacts 35 and the contacts b of the contactor 2A upon closure of the contacts of the relay 3AR, and the contacts m of the contactor 3A thereupon close to short circuit the additional resistor section R3 causing the motor to operate as indicated by the curve 74 of Fig. 6. The energizing circuit for the contactor 4A is completed through the contacts 36 and the contacts b of the contactor 3A upon closure of the contacts of the relay 4AR. When a speed is reached causing the contacts of the relay 5AR to close, the contactor 5A responds to short circuit all of the secondary resistance and the motor operates as indicated by the curve 72. Since the contacts 22, 23, 24, and 25 remain closed in the fifth lowering position, the excitation of eddy current brake E is not materially altered upon operation of the contactors 2A, 3A, and 4A and the hoist accelerates as indicated by the curves 94'. Opening of normally open auxiliary contacts b of the contactor 5A disconnects the winding Ew from its source of energization, and the brake E no longer exerts a retarding torque. Overhauling loads are now lowered by regenerative braking alone as indicated by the curve 95.

Upon return of the master switch MS from any one of the lowering points to the off point, the contactors L and 1A through 5A and the relays TD and BR are deenergized. The contacts 27 and 28 are now closed and connect the winding Ew between the tap m and the positive terminal of the resistor R7. Since the contacts of the time delay relay TD remain closed for a time interval after deenergization of its operating winding, the brake E remains excited for a predetermined time interval after the master switch MS is returned to the off position and assists the friction brake B in bringing the load to a stop.

Although in the controller illustrated, adjustable voltages have been taken from the resistor R7 in order to obtain the spread in the resultant voltages 55 through 58, it is apparent that taps on the resistor R8 could be provided instead for this purpose, or taps on both resistors could be utilized.

It is also apparent that one or more steps of unbalanced voltage braking could be provided for the motor 10 with or without assistance from the braking generator. Although, in the illustrative embodiment, the same acceleration relays are used during both hoisting and lowering and are arranged to operate at the same selected speeds, respectively, whether lowering or hoisting, means could be provided to alter the operating characteristics of the relays for lowering control or separate relays and relay circuits could be used for hoisting and lowering as is well known in the art.

Having thus described my invention, I claim:

1. A control system for the type of hoists powered by a polyphase wound rotor induction motor having an external secondary circuit and arranged to drive loads and to be driven by descending loads, selectively, and mechanically coupled to a braking generator means having flux producing winding means and operable to exert different degrees of torque depending upon the excitation of the winding means, said control system comprising the combination with reversing means operable to connect the motor to a source of power for causing the motor to hoist said loads and to drive said loads downwardly, selectively, a resistor arranged to be connected in said secondary circuit, switching means operable to adjust the effective resistance of said resistor, circuit means for supplying current to said winding means, means for connecting the circuit means to a source of substantially constant voltage for excitation thereby, additional means for concurrently connecting said circuit means to said secondary circuit for concurrently exciting said circuit means in accordance with an electrical condition of said secondary circuit in opposition to said excitation provided by said substantially constant voltage, thereby producing a resultant excitation of said circuit means, of means connected in said circuit means and operative to maintain said resultant excitation at a very low value until a predetermined motor speed is reached.

2. A control system according to claim 1 characterized in that an adjustment means is connected in said circuit means and is operable to vary said predetermined motor speed.

3. A control system according to claim 1 characterized in that an adjustment means, operable independently of said switching means, is connected in said circuit means and is operable to vary said predetermined motor speed.

4. A control system according to claim 1 characterized in that said last mentioned means is an asymmetrical impedance device.

5. A control system according to claim 4 characterized in that said electrical condition is a voltage in said secondary circuit, and said device is a rectifier poled in said circuit means so as substantially to prevent excitation of said circuit means when said secondary voltage is in excess of said constant voltage.

6. A control system for the type of hoists powered by a polyphase wound rotor induction motor arranged to drive loads and be driven by descending loads, selectively, and mechanically coupled to a braking generator having a flux producing winding and operable to exert a braking torque in relation to the degree of excitation of its winding, said control system comprising reversing means operable to connect the motor to a source of power for causing the motor to hoist said loads and to drive said loads downwardly, selectively, means for producing a variable potential that varies inversely with the speed of the motor, constant potential means for producing a substantially constant reference potential that is less than said variable potential at slow operating speeds of the motor and greater than said variable potential at higher operating speeds of the motor, circuit means for opposing said two potentials to obtain a differential potential that varies directly with the speed of the motor, means for connecting said flux producing winding to said circuit means for energizing said winding by said differential potential, and an asymmetrical impedance device in said circuit means substantially eliminating said differential potential when said reference potential is less than said variable potential.

7. A control system for hoists powered by a polyphase wound rotor induction motor having an external secondary circuit and arranged to drive loads and to be driven by descending loads, selectively, and mechanically coupled to a braking generator having a flux producing winding and operable to exert a braking torque depending upon the degree of excitation of its winding, said control system comprising reversing means operable to connect the motor to a source of power for causing the motor to hoist said loads and to drive said loads downwardly, selectively, a resistor arranged to be connected in said secondary circuit, switching means operable to adjust the effective resistance of said resistor, and means for connecting said winding to said secondary circuit for exciting said winding in accordance with an electrical condition of said secondary circuit, said last named means including means for substantially preventing energization of the winding until a predetermined speed is reached while lowering.

8. An exciting circuit for supplying the flux producing winding of a braking generator mechanically coupled to a polyphase wound rotor induction motor having a secondary circuit and comprising means including a rectifier connected to said secondary circuit for providing a unidirectional potential which varies inversely with the speed of said motor, a source of substantially constant unidirectional reference potential, circuit means for opposing said two potentials to obtain a differential potential that varies directly with the speed of said motor, means for connecting said flux producing winding to said circuit means for energizing said winding by said differential potential, and said circuit means including an asymmetrical impedance device which substantially prevents operative energization of said winding when said variable potential exceeds said reference potential.

9. A control system for the type of hoists powered by a polyphase wound rotor induction motor having an external secondary circuit and arranged to drive loads and to be driven by descending loads, selectively, and mechanically coupled to a braking generator means having flux producing winding means and operable to exert different degrees of torque depending upon the excitation of the winding means, said control system comprising the combination with reversing means operable to connect the motor to a source of power for causing the motor to hoist said loads and to drive said loads downwardly, selectively, a resistor arranged to be connected in said secondary circuit, switching means operable to adjust the effective resistance of said resistor, circuit means for supplying current to said winding means, means for connecting said circuit means to a source of substantially constant voltage to produce in a portion of said circuit means a substantially constant reference voltage, additional means for concurrently connecting said circuit means to said secondary circuit for concurrently producing in a portion of said circuit means a voltage which varies in accordance with an electrical condition of said secondary circuit, said circuit means including terminals across which a resultant voltage appears that is determined by the values of said substantially constant voltage and said variable voltage and varies directly with the speed of the motor, and means connecting said winding means to said terminals, of means connected in said circuit means and operative to maitain said resultant voltage at a very low value until a predetermined speed is reached.

10. An exciting circuit for supplying the flux producing winding of a braking generator mechanically coupled to a polyphase wound rotor induction motor having a secondary circuit and comprising means including a rectifier connected to said secondary circuit for providing a unidirectional potential which varies inversely with the speed of said motor, a source of substantially constant unidirectional reference potential, circuit means for combining said two potentials to obtain a resultant potential that varies directly with the speed of said motor, means for connecting said flux producing winding to said circuit means for energizing said winding by said resultant potential, and said circuit means including an asymmetrical impedance device which substantially prevents operative energization of said winding when said variable potential exceeds said reference potential.

HAROLD J. RATHBUN.

No references cited.